United States Patent
Bennison

[11] Patent Number: 5,352,082
[45] Date of Patent: Oct. 4, 1994

[54] BAG SLITTING MACHINE

[75] Inventor: Stewart Bennison, Sheepbridge, England

[73] Assignee: Palamatic Handling Systems Limited, Chesterfield, England

[21] Appl. No.: 809,736

[22] Filed: Dec. 17, 1991

[30] Foreign Application Priority Data

Dec. 22, 1990 [GB] United Kingdom ............... 9027976.1

[51] Int. Cl.$^5$ .............................................. B65B 69/00
[52] U.S. Cl. ..................................... 414/412; 83/156; 83/157
[58] Field of Search ................... 414/412; 83/156, 157, 83/161, 162, 564, 813

[56] References Cited

U.S. PATENT DOCUMENTS

| | | | |
|---|---|---|---|
| 2,660,324 | 11/1953 | Trautschold | 414/412 |
| 3,394,827 | 7/1968 | Shorthouse | 414/412 |
| 3,575,074 | 4/1971 | Aizawa | 83/564 X |
| 3,664,530 | 5/1972 | Takiguchi | 414/412 |
| 4,008,657 | 2/1977 | Yamamura et al. | 414/412 X |
| 4,034,877 | 7/1977 | Bennison | 414/412 |
| 4,289,438 | 9/1981 | Murer | 414/412 |
| 4,725,184 | 2/1988 | Bennison | 414/412 |
| 4,798,508 | 1/1989 | Lewis | 414/412 |
| 4,938,649 | 7/1990 | ter Horst et al. | 414/412 |

FOREIGN PATENT DOCUMENTS

| | | | |
|---|---|---|---|
| 0198685 | 10/1986 | European Pat. Off. | |
| 1547391 | 11/1968 | France | |
| 1604671 | 11/1990 | U.S.S.R. | 414/412 |
| 2060545 | 5/1981 | United Kingdom | 414/412 |
| 1591972 | 7/1981 | United Kingdom | |
| 2092980 | 8/1982 | United Kingdom | |
| 2138769 | 10/1984 | United Kingdom | |

*Primary Examiner*—David A. Bucci
*Attorney, Agent, or Firm*—Trexler, Bushnell, Giangiorgi & Blackstone, Ltd.

[57] ABSTRACT

A machine for slitting filled bags, incorporates saw and displacement structure to cause relative movement between the saw and a bag to be slit, the saw comprising a blade in which a cutting section of the blade is located orthogonally with respect to the direction of relative movement such that the cutting section penetrates a leading end of the bag and, during continued relative movement, cuts through both the bag contents and the bag sides, towards the trailing end of the bag.

13 Claims, 4 Drawing Sheets

BAG SLITTING MACHINE

BACKGROUND OF THE INVENTION

This invention relates to a bag slitting machine for the slitting and emptying of bags containing products such as asbestos, cement, grain, etc.

Known machines are described in GB 0198685, GB 1315853, GB 2060545, GB 2092980 and U.S. Pat. No. 3,853,235. Previous systems have usually employed a pair of circular cutting blades or saws adapted firstly to form a cut in one end of the bag and secondly to continue the cut individually along each lateral side of the bag, and this cutting technique has required a specialised conveyor means capable of driving the bag along the cutters, and hence has usually required the use of a spiked chain conveyor to engage the bag to provide for positive drive of the bag through the cutters.

The present invention provides a machine which departs from this conventional cutting technique, and yet which achieves not only rapid bag cutting and hence contents discharge, but also machine production cost reduction.

SUMMARY OF THE INVENTION

According to the present invention, there is provided a machine for slitting filled bags, incorporating saw means, and displacement means to cause relative movement between the saw means and a bag to be slit, the saw means comprising a blade in which a cutting section of the blade is located orthogonally with respect to the direction of relative movement such that the cutting section penetrates a leading end of the bag and, during continued relative movement, cuts through both the bag contents and the bag sides, towards the trailing end of the bag.

Although the relative movement could be effected by displacing the saw means, with the bag static, preferably the bag is displaced with respect to a statically positioned saw means. Such bag displacement means conveniently comprises a conveyor means (such as a relatively cheap belt conveyor, or a relatively expensive spiked conveyor with retractable spikes) or the convex periphery of a feed roller; or a gravity chute (either vertical or inclined).

The saw means preferably takes the form of a band saw, although a reciprocating blade saw means could be used.

Beyond the saw means, the machine is preferably provided with support means, such as a plurality of bars, for temporarily supporting the upper part of a partially or wholly slit bag. Some embodiments of the machine would also benefit from the presence of bag guide bars to guide the lower part of the bag downwardly and hence assist in exposing the bag contents for efficient emptying.

With a belt conveyor, downward movement of the lower part of the bag may be effected by providing a plurality of discs (which may be freely rotatable or driven in the opposite direction to the conveyor) adjacent the discharge end of the belt conveyor, to define a nip capable of gripping firstly the lower part of a partially slit bag and then eventually the upper part of the bag until the entire bag has been passed, in an emptied condition, through the nip.

With a vertical gravity chute, a nip may be defined between an array of bag guide bars beyond the saw means, and a roller with retractable spikes, the periphery of the roller being appropriately spaced from the guide bars to define a nip through which firstly the lower part of a partially slit bag and then eventually the upper part of the bag is dragged by the spikes until the entire bag has been passed, in an emptied condition, through the nip.

With a feed roller this may form part of a feed screw, with the bags fed laterally on to the top of the feed screw, to constitute a combined feed roller and screw. With this last mentioned arrangement a nip roller may be provided adjacent the screw, again to define a nip into which a slit bag is pulled firstly by its lower part, and then by its upper part.

Irrespective of the various possibilities of feed arrangement, the slit bags may, if required, be allowed to fall into a rotatable, wire mesh emptying cage in which the bags are retained, for later removal, with any remaining bag contents adapted to fall from the cage onto suitable conveying or storage means.

With a belt conveyor, this may be horizontal or inclined, depending on the materials of the belt and of the bags and hence the coefficient of friction and the force required to drive a bag into the saw means.

Progressive separation of slit bag is ensured if, in accordance with another preferred proposal, a transverse splitter bar is provided. Such a splitter bar may be of fixed position, or may be advanceable and retractable.

In accordance with a preferred technique cutting is halted shortly before the blade reaches the trailing end of the bag. This may be achieved by any of various means, such as by employing sensing means to detect the trailing end, and possibly also the leading end, of a bag, and upon detection of the trailing end, to activate a movable, e.g. pivotable, obstruction means, such as the advanceable and retractable splitter bar referred to earlier to displace the latter to a position in advance of the blade thus to obstruct further bag advance so that the part slit bag may be pulled from the conveying means, e.g. by the technique described in GB 0198685 for bag emptying purposes, or for completion of bag emptying. In an alternative manner of achieving this effect, the cutting action of the blade may be stopped and, with a diamond coated blade for instance, which, in contrast to a conventional, reciprocable blade, would not be provided with a serrated tooth edge, and hence would not form a cutting edge, so that by stopping such a blade, the blade itself acts as an obstruction means and the upper part of a part-slit bag would automatically start to feed in the reverse direction over the top of the blade.

In accordance with another possibility, it will be appreciated that cutting can be effected completely through the bag from its leading end to its trailing end, so that an upper part of the bag is completely separated from a lower part of the bag.

BRIEF DESCRIPTION OF THE DRAWINGS

The invention will now be further described in greater detail, by way of examples, with reference to the accompanying drawings, in which.

In all embodiments, like components are accorded like reference numerals.

DETAILED DESCRIPTION OF THE PREFERRED EMBODIMENTS

Figure 1:
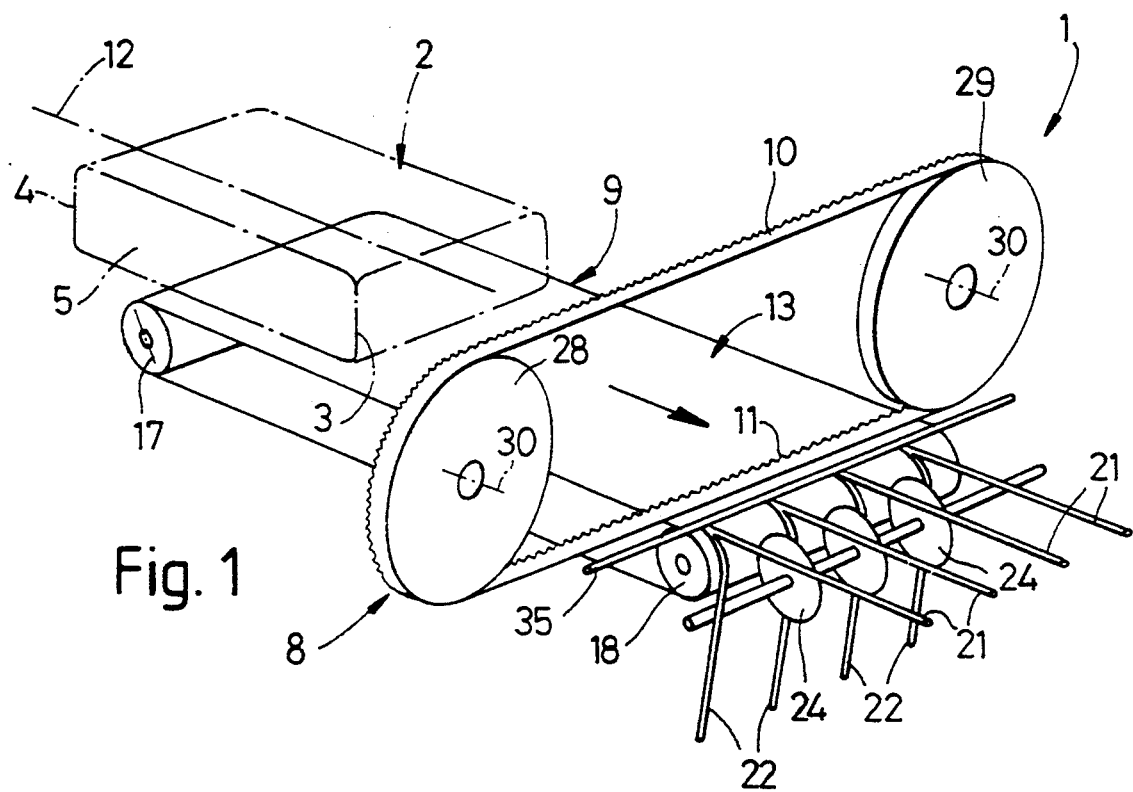
FIG. 1 is a perspective view of a first embodiment of machine.

A machine 1 is provided for slitting filled bags 2, of industry-standard profiles, forms and capacities such as paper bags or hessian sacks, each bag 2 comprising a leading end 3, a trailing end 4, lateral sides 5 and, after slitting as will be described later, an upper part 6 and a lower part 7. The machine 1 incorporates saw means 8 and displacement means 9 to cause relative movement between the saw means 8 and the bag 2 to be slit. The saw means 8 preferably comprises band saw having an endless band 10 in which a cutting section 11 is located orthogonally with respect to the direction of relative movement, and which as illustrated is orthogonal to longitudinal axis 12 of the bag 2 such that the cutting section 11 penetrates the leading bag end 3 and, during continued relative movement cuts through both the bag contents and the bag sides 5, towards the trailing end 4 of the bag 2.

Relative movement between the bag 2 and saw means 8 is preferably effected by displacing the bag 2 with respect to a statically positioned saw means 8. For this purpose bag displacement is effected by conveyor means, specifically a belt conveyor 13 in the embodiment of FIGS. 1 and 2; or a vertical gravity chute 14 in the embodiment of FIGS. 3 and 4, or a feed roller/screw 15 in the embodiment of FIGS. 5 and 6.

Figure 2:
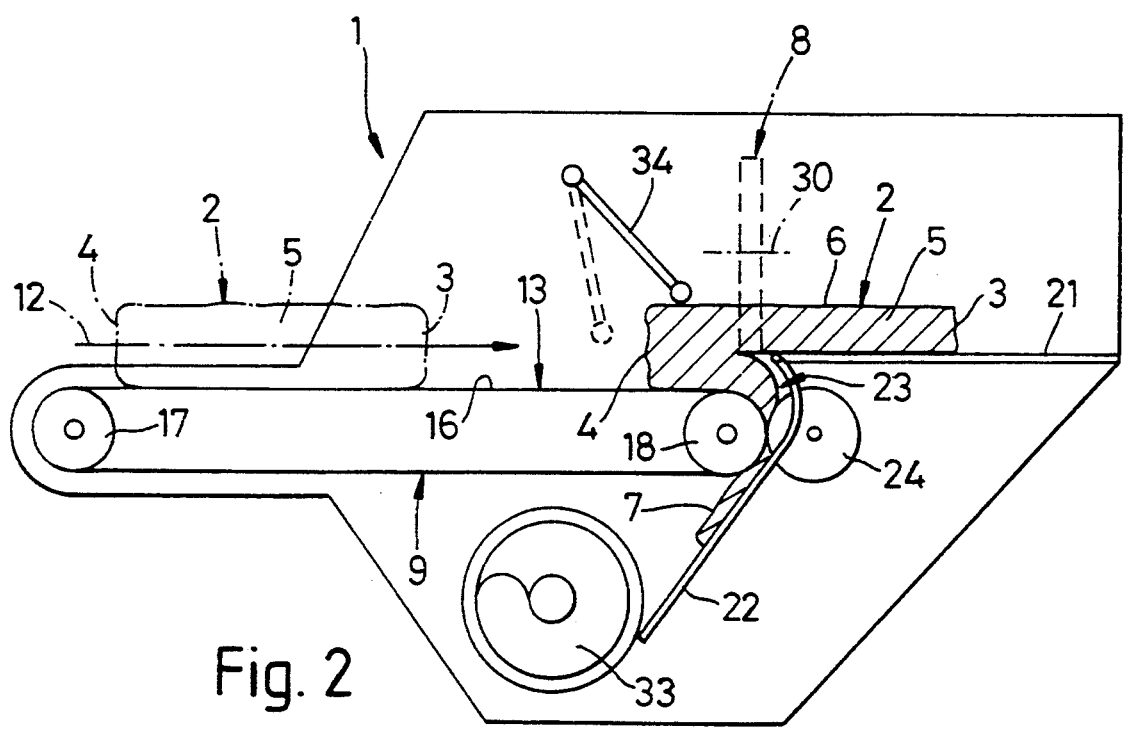
FIG. 2 is a side elevation of FIG. 1.

Thus, in the embodiment of FIGS. 1 and 2 the belt conveyor 13 has an upper belt run 16 onto which bags 2 to be slit are loaded by any convenient means—normally manually or mechanically—the conveyor having a head drum 17 and a tail drum 18.

Figure 3:
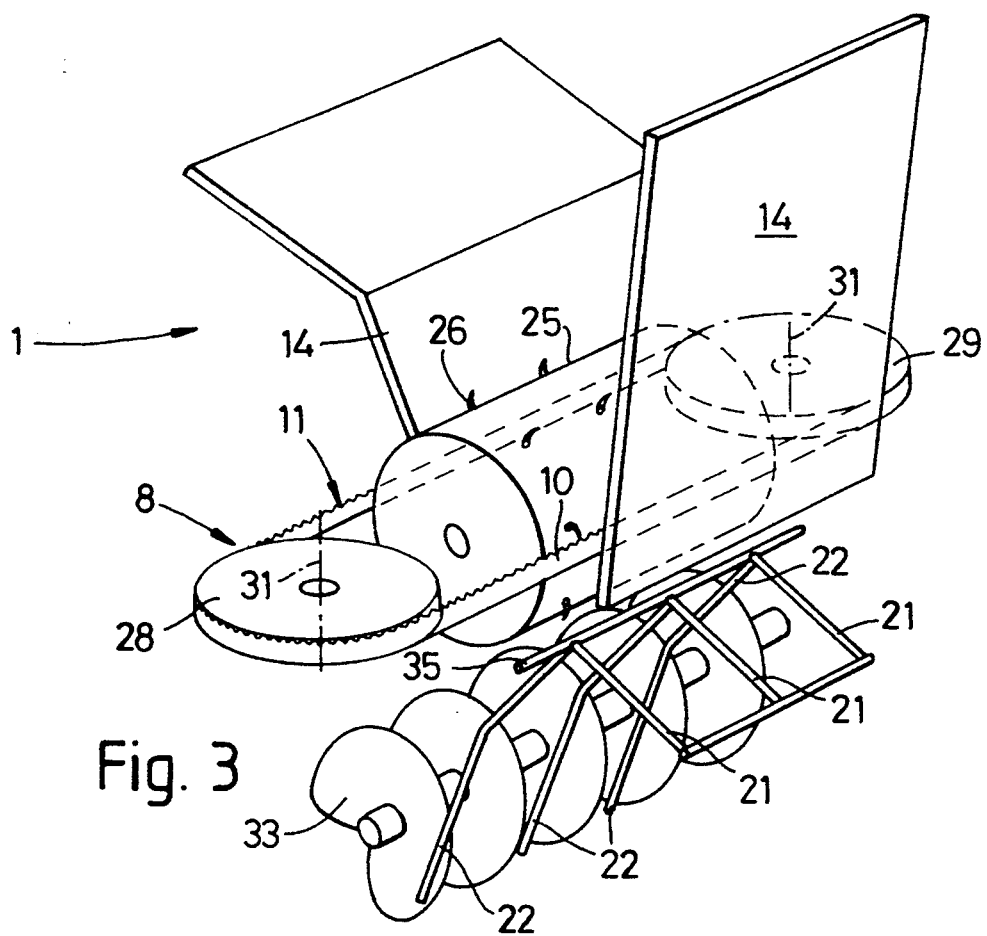
FIGS. 3 and 4 correspond to FIGS. 1 and 2 but show a second embodiment of machine.
Figure 4:
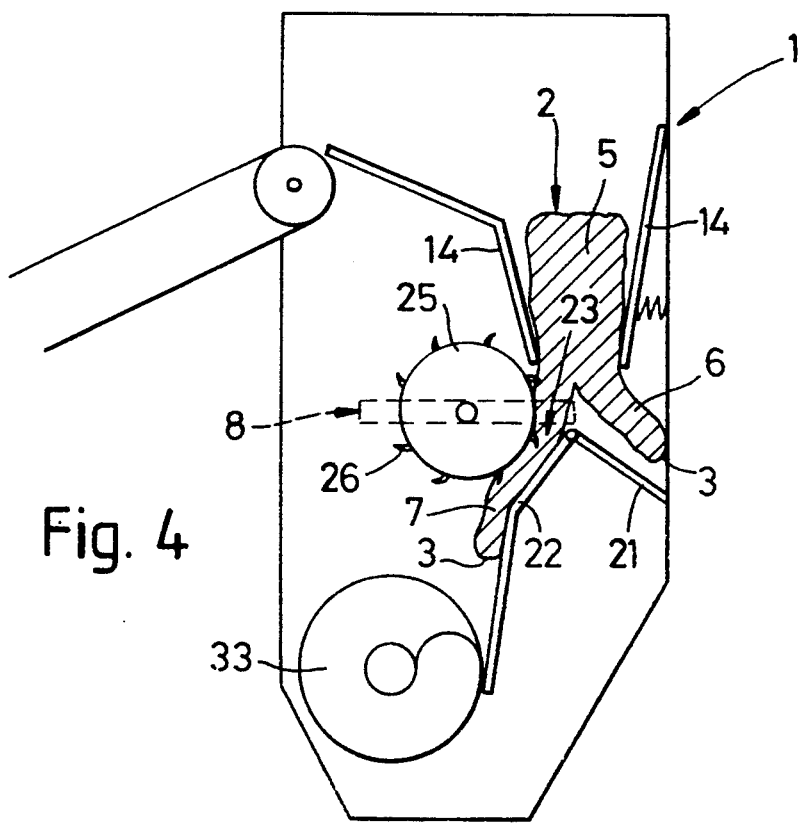

In the embodiment of FIGS. 3 and 4, bag displacement by the gravity chute 14, is aided by a driven roller 25 with retractable spikes 26.

Beyond the saw means 8, the machine 1 is provided with support means in the form of a plurality of parallel bars 21 for temporarily supporting the upper part 6 of the bag 2, while in the embodiments of FIGS. 1 and 2 and FIGS. 3 and 4 a plurality of parallel guide bars 22 are provided. In FIGS. 1 and 2 a nip 23 is defined between a plurality of driven or non-driven rotatable discs 24 and tail drum 18, through which nip 23 the slit bag is progressively pulled, beginning with its lower part 7, as FIG. 2 indicates. In FIGS. 3 and 4, the nip 23 is defined between guide bars 22 and the periphery of a driven roller 25 provided with retractable spikes 26 and located within the saw means 8.

Figure 5:
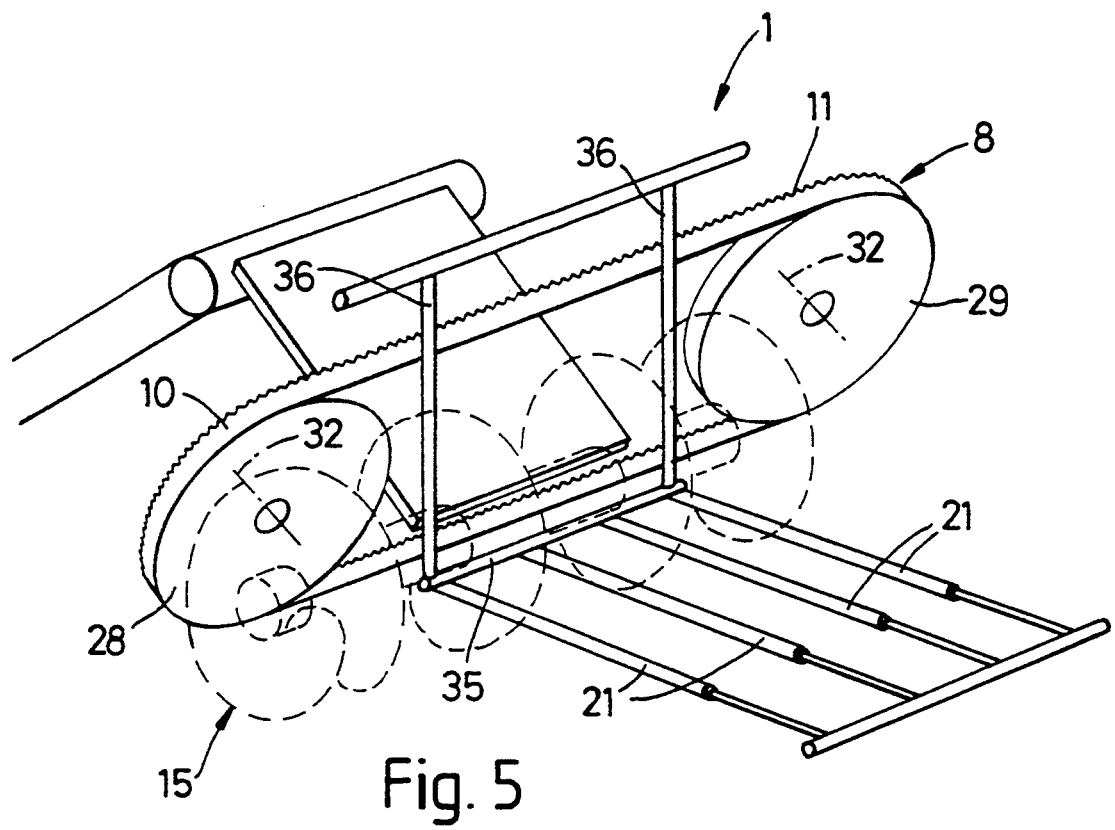
FIGS. 5 and 6 also correspond to FIGS. 1 and 2 but show a third embodiment of machine.
Figure 6:
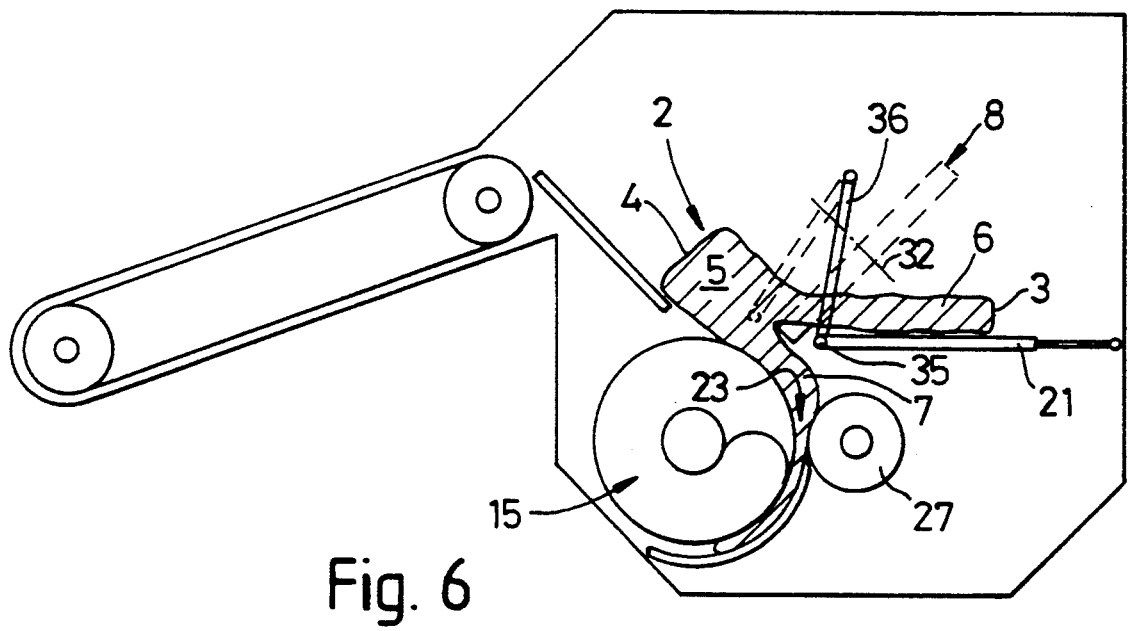

In the embodiment of FIGS. 5 and 6, the nip 23 is defined between the feed roller and screw 15 and roller means 27.

The saw means 8, in all three embodiments, has the band 10 extending, under suitable tension, between a drive pulley 28 and a return pulley 29 with the cutting section 11 of length exceeding the width of the bags 2. The pullies 28 and 29 may be rotatable about horizontal axes 30 (FIGS. 1 and 2), vertical axes 31 (FIGS. 3 and 4) or inclined axes 32 (FIGS. 5 and 6), while the diameters of the pullies 28 and 29 may be such that equipment (e.g. the spiked roller 25 of FIGS. 3 and 4) may be located within the saw means 8.

Also in the embodiments of FIGS. 1 to 4, slit bags 2 are conveyed away by a screw auger 33 while in the embodiments of FIGS. 5 and 6, the feed roller/screw 15 serves this purpose.

In FIG. 2 is indicated a simple pendulum type sensor 34 for sensing the presence of the trailing end 4 of the bag 2, whereupon the sensor 34 falls, clockwise, to the position indicated in dotted line. This sensor movement may be employed to trigger a control system (not shown) to stop the drive to pulley 28 and hence to stop the movement of the band 10. With the latter being of the diamond coated type, the cutting section 11 thereafter acts as an obstruction means to prevent further bag advance and hence to prevent the upper bag part 6 being completely separated from the lower bag part 7.

Progressive separation of the upper and lower parts 6 and 7 is ensured, as slitting proceeds along the bag by the bag being displaced past the cutting section 11 of the band 10, by the presence in the first three embodiments of a splitter bar 35, which in the embodiments of FIGS. 1 to 4 is static, but which in the embodiments of FIGS. 5 and 6 is supported from link arms 36 swingable between a non-active position within the band 10, and an active position shown in dotted line, under the control of a bag end sensor 34, ahead of the cutting section 11, to halt further bag displacement.

Figure 7:
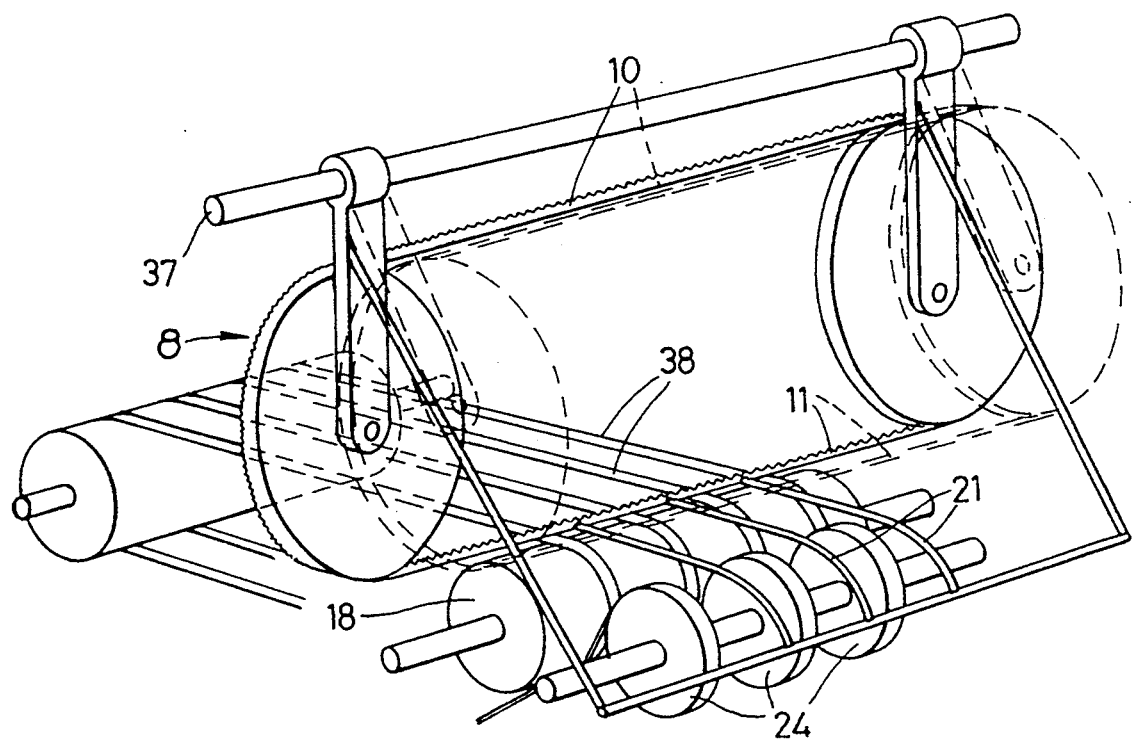
FIG. 7 corresponds to FIGS. 1, 3 and 5 but shows a fourth embodiment.
Figure 8:
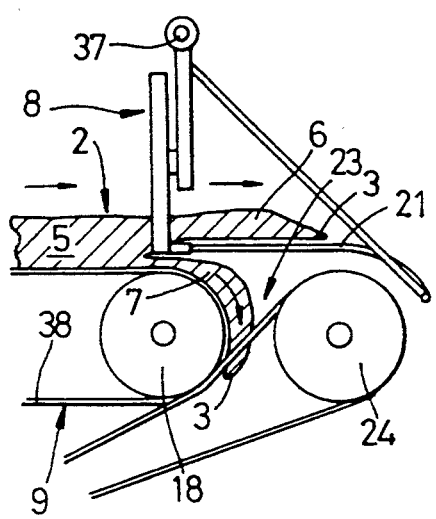
FIGS. 8 and 9 are side elevations of FIG. 7, showing two different operational positions.
Figure 9:
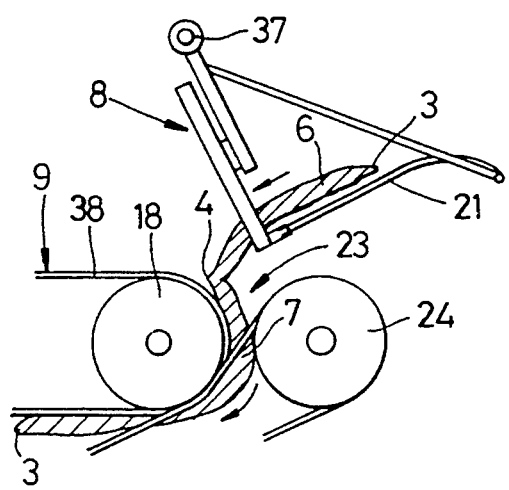

FIGS. 7 to 9 indicate that the cutting section 11 of the band 10 additionally functions as a splitter bar, with sensing of the trailing end 4 of the bag 2 swinging the entire saw means 8 about the axis 37 from the cutting position illustrated in FIG. 8 (where the cutting section 11 additionally functions as a splitter bar), to the slit bag release position illustrated in FIG. 9, and also illustrated in dotted line in FIG. 7. FIG. 7 also indicates that the belt conveyor 13 can comprise a plurality of individual and mutually spaced-apart belts 38.

What is claimed is:

1. A machine for slitting filled bags, said machine incorporating:
   (i) saw means to effect slitting;
   (ii) displacement means to cause progressive relative movement between said saw means and a bag to be slit;
   (iii) a splitter means located downstream of said saw means in said direction of relative movement and transversely of said direction of relative movement, to progressively penetrate said slit bag to ensure progressive separation of said slit bag; and
   (iv) means to advance said splitter means to an active position and to retract said splitter means to a non-active position.

2. A machine as claimed in claim 1, wherein said displacement means is effective on said bag, with said saw means statically positioned.

3. A machine as claimed in claim 2, wherein said bag displacement means comprises a conveyor means.

4. A machine as claimed in claim 3, wherein said conveyor means is a belt conveyor.

5. A machine as claimed in claim 3, wherein said displacement means comprises a gravity chute.

6. A machine as claimed in claim 5, wherein said chute is inclined.

7. A machine as claimed in claim 1, wherein said saw means takes the form of a band saw.

8. A machine as claimed in claim 1, comprising, beyond the saw means in said direction of relative movement, support means for temporarily supporting an upper part of a partially or wholly slit bag.

9. A machine as claimed in claim 1, wherein said splitter means is pivotal between said active position and said retracted, position.

10. A machine claimed in claim 1, wherein said splitter means is a splitter bar.

11. A machine as claimed in claim 1, wherein the splitter means is said blade of said saw means.

12. A machine as claimed in claim 1, comprising bag detection sensing means, to activate said means to advance and retract said splitter means.

13. A machine as claimed in claim 12, comprising sensing means for detecting said trailing end of said bag.

* * * * *